United States Patent Office 3,420,259
Patented Jan. 7, 1969

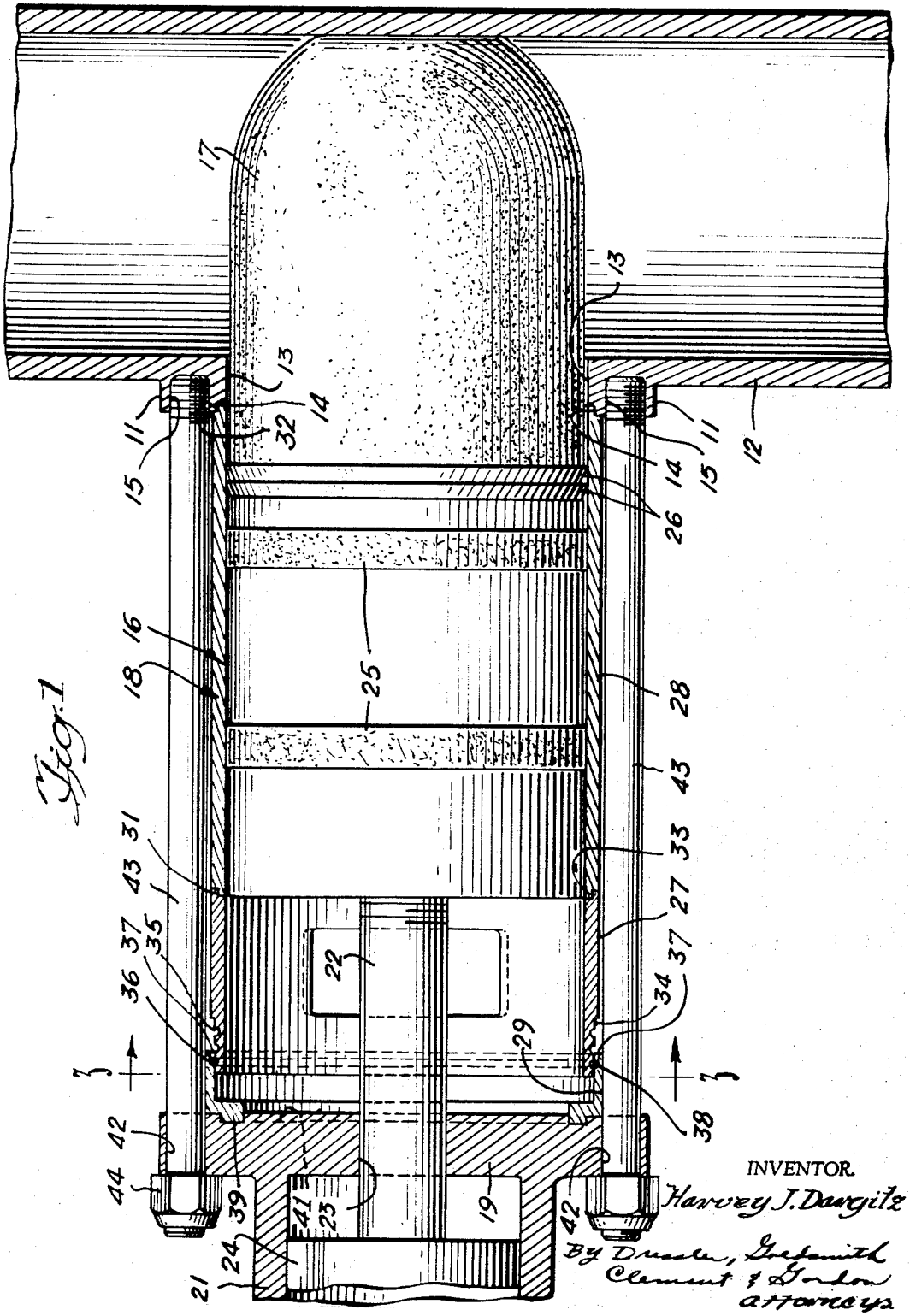

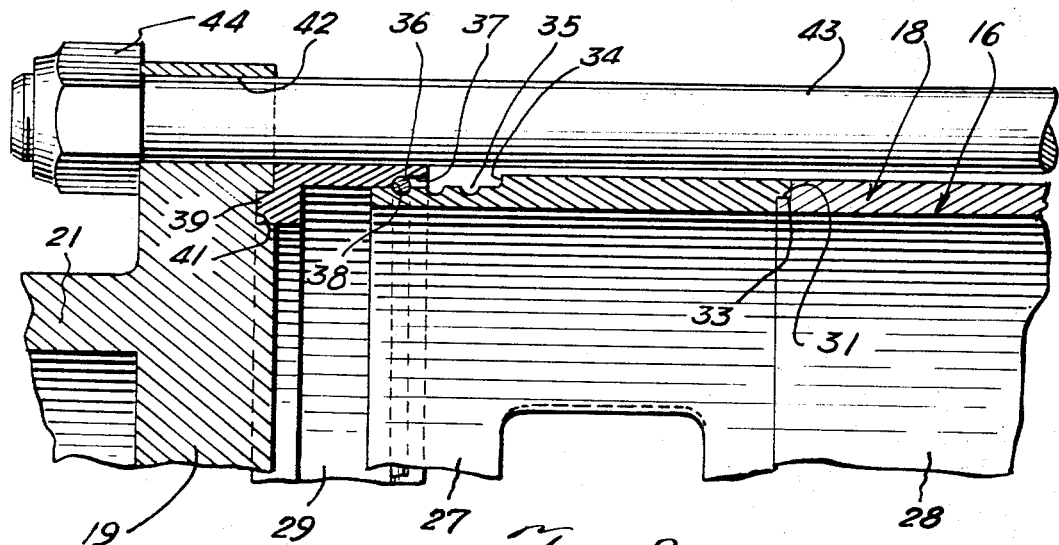
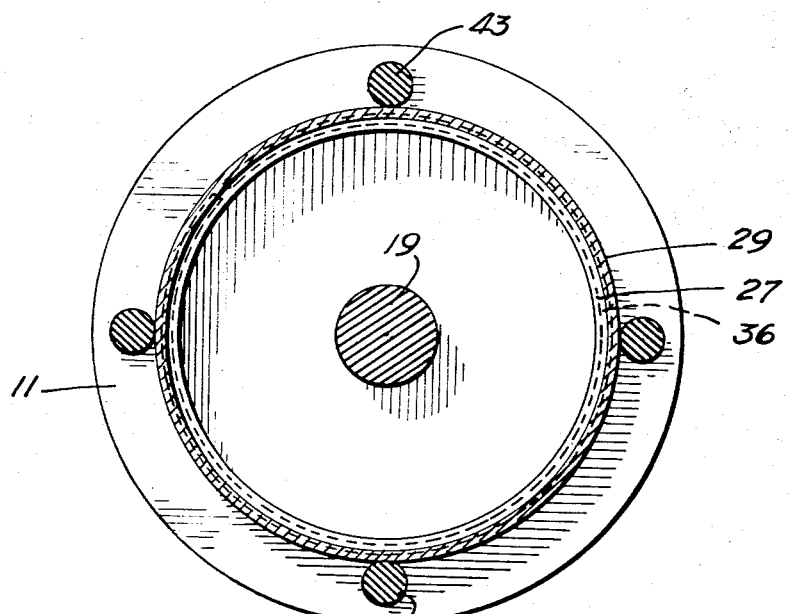

3,420,259
REVERSIBLE ADJUSTABLE SLEEVE ASSEMBLY
FOR A PLUG VALVE
Harvey J. Dargitz, Leaf River, Ill., assignor to J. I. Case
Company, a corporation of Wisconsin
Filed Sept. 12, 1966, Ser. No. 578,645
U.S. Cl. 137—270                                    5 Claims
Int. Cl. F16k 3/28

This invention relates to a sleeve assembly for guiding the reciprocatory movement of a plug valve into and out of a conduit for regulating the flow of material through the conduit, and is particularly concerned with means for easily adjusting the length of the sleeve assembly and for increasing its useful life.

It is common practice to regulate the flow of concrete mix, or other abrasive mixtures through a conduit by a plug valve. The plug valve is reciprocated into and out of the conduit through an opening in the sidewall of the conduit by a piston housed in a hydraulic cylinder. The plug valve is designed to completely block the flow of concrete mix through the conduit when it it is in position within the conduit. The outer end of the plug often engages some concrete mix as it is moved into engagement with the inner wall surface of the conduit. The abrasive action of the concrete mix wears down the outer end of the plug, and from time to time adjustments are necessary to enable the plug valve to completely close the conduit. The plug valve is guided by a sleeve assembly held in contact with the wall of the conduit adjacent the opening by a plurality of studs threaded into engagement with the conduit. The other end of each stud extends through the flange of the hydraulic cylinder, and each stud has a nut tightened against the flange to hold the sleeve assembly in place between the flange and the conduit in axial alignment with the hydraulic cylinder.

The sleeve assembly is provided with telescoping sections so that the sleeve assembly can be shortened and the hydraulic cylinder can be moved closer to the conduit to compensate for wear on the end of the plug. Each nut is tightened separately to adjust the position of the hydraulic cylinder flange and to change the effective length of the sleeve assembly. This type of adjustment has not been too satisfactory because the axial alignment of the hydraulic cylinder and the sleeve assembly may be destroyed if the nuts are not tightened evenly. Such misalignment may damage the mechanism and cause premature failure of the plug valve. It has heretofore been necessary to use a feeler gauge in order to adjust the studs correctly.

It has also been found in prior practice that the end of the sleeve assembly adjacent the plug is frequently worn by the abrasive action of small amounts of concrete mix pulled into the end of the sleeve assembly by the plug when it is retracted from the conduit. In time this wear impairs the efficiency of the plug valve and necessitates replacement of the sleeve assembly.

In the sleeve assembly constructed in accordance with the present invention, the operator can change the length of the sleeve assembly and adjust the position of the hydraulic cylinder flange relative to the conduit quickly without the use of a gauge and without any possibility of destroying the axial alignment of the cylinder and the sleeve assembly. Whenever the length of the sleeve assembly is adjusted, the hydraulic cylinder is moved toward or away from the conduit a distance equal to the adjustment, so that the piston stroke remains constant and the plug is moved into and out of blocking engagement with the conduit. The improved structure has an additional advantage in that the outer end section of the sleeve assembly is reversible, so that when one end becomes worn, the end section may be reversed to double the useful life of the sleeve assembly.

Suitable structure by means of which the abovementioned and other advantages of the invention are attained will be fully described in the following specification, taken in conjunction with the accompanying drawings showing a preferred embodiment of the invention, in which:

FIGURE 1 is a cross-sectional view showing a sleeve assembly embodying the invention;

FIGURE 2 is an enlarged fragmentary cross-sectional view showing the adjustment means at one end of the sleeve assembly; and FIGURE 3 is a cross-sectional view, taken in the plane indicated by the line 3—3 of FIGURE 1.

In the drawings, a circular boss 11 projecting outwardly from one side of a tubular conduit 12 defines an opening 13 extending through one wall of the conduit. The boss 11 is provided with an inner annular recess 14 and a plurality of threaded recesses 15 spaced circumferentially of the opening 13 for purposes hereinafter disclosed.

A plug valve 16, having a plug 17 of the same diameter as the opening 13, is mounted for reciprocation in a sleeve assembly 18 that has one end seated against the circular boss 11 and its other end seated against the flange 19 of a hydraulic cylinder 21. The plug valve is secured to one end of a piston rod 22 that extends through an aperture 23 in the flange of the hydraulic cylinder 21. A piston 24 reciprocates the plug valve in the sleeve assembly to move the outer end of the plug into and out of engagement with the inner surface of the conduit wall. The conduit provides a flow passageway for concrete mix when it is unobstructed, but it is completely blocked when the plug 17 is in engagement with the wall.

The valve is provided with sealing rings 25 and washers 26 on its outer surface. The washers 26 scrape out any of the concrete mix that may be pulled into the sleeve assembly 18 when the plug is being retracted. The concrete mix, even in small amounts, abrades the inner surface at the end of the sleeve assembly 18 as it is pulled into it by the plug and as it is scraped out by the washers 26.

The sleeve assembly 18 comprises at least one intermediate section 27 and two end sections 28 and 29. The opposite ends of the end section 28 are provided with recesses 31, 32, respectively, whereby they may be interchangeably fitted against the recessed outer end of the boss 11. The end of the intermediate section 27 adjacent the end section 28 is provided with a recess 33 oppositely disposed, relative to the recess 14, whereby both ends of the end section 28 interchangeably fit against the adjacent end of the intermediate section. Accordingly, when the inner surface at one end of the end section 28 becomes worn, the end section 28 may be reversed end for end to prolong the useful life of the sleeve assembly. The condition of the inner end of the end section 28 does not affect the use of the sleeve assembly because it is located inwardly of the innermost sealing ring 25.

The opposite end of the intermediate section 27 has a recess 34 on its outer surface that provides a telescoping relationship with the adjacent end of the end section 29. The recessed portion of the section 27 is adapted to fit within the adjacent end of the section 29, and the two sections may be moved relative to each other to vary the length of the sleeve assembly 18. The outer surface of the recessed portion of the section 27 is provided with a plurality of axially spaced annular grooves 35, and a wire snap ring 36 is adapted to be selectively positioned in any one of the grooves 35 to adjust the length of the sleeve assembly. The ring 36 is made of wire that is thicker than the depth of the grooves 35.

The inner surface of the telescoping end of section 29 has a recess 37 extending from the telescoping end of the section and terminating in a shoulder 38. The recess 37 provides enough clearance for the ring 36 to seat in one of the grooves 35 and to project far enough above the surface of the recess 34 to be engaged by the shoulder 38. The shoulder 38 is pressed against the ring 36, in a manner hereinafter described, to hold the ring in the groove in which it is positioned and thereby prevent relative axial movement of the sections 27 and 29 in one direction.

The other end of the end section 29 is provided with an annular flange 39 adapted to fit in a recess 41 in the outer surface of the hydraulic cylinder flange 19. The flange 19 is provided with a plurality of circumferentially spaced bores 42, each of which is axially aligned with one of the threaded recesses 15. Studs 43 extending through the bores 42 are threaded into the recesses aligned therewith. Nuts 44 threaded on the opposite end of each stud 43 are tightened against the flange 19 to hold the sleeve assembly between the hydraulic cylinder 21 and the conduit 12 in axial alignment with the piston 24 and the opening 13. Although the sleeve assembly is shown as having four studs 43, it will be understood that this number may be varied.

The axial alignment of the sleeve assembly with the hydraulic cylinder is critical because of the excessive wear on the plug valve caused by even slight misalignment. When the outer end of the plug 17 becomes worn, and it is necessary to adjust the position of the plug relative to the conduit in order to enable the plug to block the conduit completely, the nuts 44 are loosened to release the axial pressure against the end section 29. The end section 29 is then moved to make the ring 36 accessible, and the ring is repositioned in a groove 35 closer to the conduit to reduce the length of the sleeve assembly. The end section 29 is repositioned with its ends in telescoping relationship to the recess 34 and the flange 39 is positioned in the recess 41. The nuts are then tightened on the studs 43 to hold the sleeve assembly in its adjusted position. When adjusting the length of the sleeve assembly, the hydraulic cylinder is moved far enough toward the conduit to compensate for the wear on the outer end of the plug so that the same stroke of the piston will move the plug into blocking engagement with the inner surface of the conduit. When the plug 17 is so worn that it must be replaced, the above procedure is repeated, except that the ring 36 is repositioned in a groove 35 farther from the conduit and the hydraulic cylinder is moved away from the conduit.

Although a preferred embodiment of the invention has been described in considerable detail, it will be understood that the description thereof is intended to be illustrative, rather than restrictive, as many details may be modified or changed without departing from the spirit or scope of the invention. Accordingly, it is not desired to be restricted to the exact structure described.

What is claimed is:

1. An adjustable sleeve assembly for a plug valve, said sleeve assembly comprising a plurality of axially aligned tubular sections, the adjoining ends of two adjacent sections being in telescoping relationship, interlocking means for holding said telescoping sections against relative axial movement, means on one of said telescoping sections for receiving said interlocking means in a plurality of axially spaced positions, abutment means on said other telescoping section engageable with said interlocking means, and means urging said abutment means against said interlocking means whereby the length of said sleeve assembly may be varied and said telescoping sections are held against relative axial movement.

2. A sleeve assembly as recited in claim 1, in which said second mentioned means comprises a plurality of axially spaced annular grooves.

3. A sleeve assembly as recited in claim 2, in which said grooves are located in the outer surface of the inner telescoping section, said interlocking means comprises a ring, and said abutting means comprises an annular shoulder on the inner surface of the outer telescoping section.

4. A sleeve assembly as recited in claim 1, in which said last mentioned means comprises an apertured flange abutting one end of one of said telescoping sections, a plurality of fixed studs projecting through the apertures of said flange, and a nut threaded on the projecting end of each of said studs.

5. A sleeve assembly as recited in claim 1, in which one of said telescoping sections has a recess in its end remote from its telescoping end, and a third section forming one end of said sleeve assembly has a complementary recess at both ends for interchangeable engagement with said first mentioned recess, whereby said third section may be reversed to prolong the useful life of the sleeve assembly.

References Cited

UNITED STATES PATENTS

| 2,256,775 | 9/1941 | Hubbell | 138—89 |
| 3,091,260 | 5/1963 | Milanovits et al. | 251—191 X |

WILLIAM F. O'DEA, *Primary Examiner.*

D. R. MATTHEWS, *Assistant Examiner.*

U.S. Cl. X.R.

137—315; 138—89; 251—191